W. J. McGAVOCK.
NUT LOCK.
APPLICATION FILED MAR. 6, 1911.
1,019,680.
Patented Mar. 5, 1912.
FIG. 1
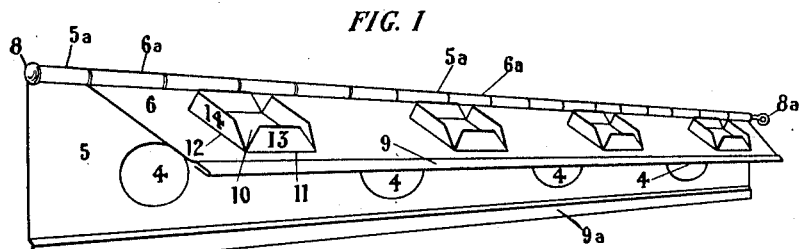
FIG. 2
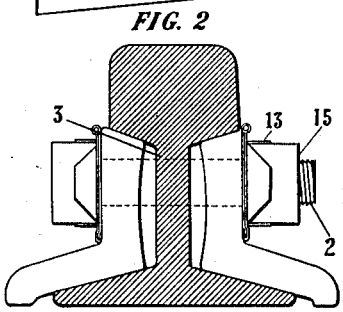
FIG. 3    FIG. 4    FIG. 5
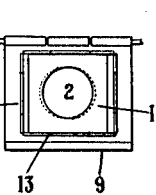  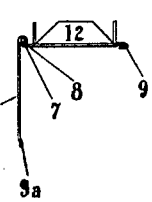
FIG. 6      FIG. 7
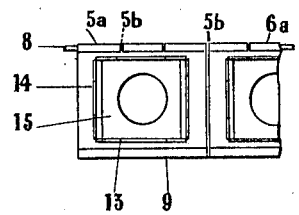 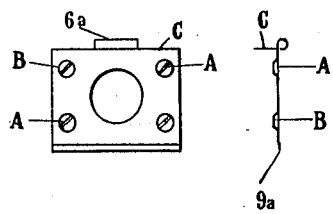
FIG. 8      FIG. 9
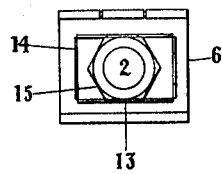 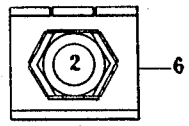
WITNESSES:
Frank S. Gorman
Edwardo Roman
INVENTOR
William John McGavock
PER
ATTORNEY
COLUMBIA PLANOGRAPH CO., WASHINGTON, D. C.

UNITED STATES PATENT OFFICE.

WILLIAM JOHN McGAVOCK, OF MEXICO, MEXICO.

NUT-LOCK.

1,019,680. Specification of Letters Patent. Patented Mar. 5, 1912.

Application filed March 6, 1911. Serial No. 612,687.

*To all whom it may concern:*

Be it known that I, WILLIAM JOHN MC-GAVOCK, contractor, a citizen of the United States, residing at city of Mexico, Mexico, have invented certain new and useful Improvements in Nut-Locks, of which the following is a specification.

Though adapted for application to a large variety of constructions normally or periodically subjected to jar or vibration, my improved device is especially intended for use in holding firmly in place the nuts which engage the points or ends of the bolts that serve to unite to the fish-plate or other equivalent butt-strap, the webs and, generally, the outer flanges of two rails which meet end to end, the bolts and nuts drawing the parts together and forming a secure butt-joint, by which the heads of the two abutting rails are maintained in alinement. Owing to the excessive vibration of the rails incident to every passage of a train over them, these nuts of the fish-plate bolts are subjected to a tendency of jarring loose from their seats against the fish-plate face, at intervals of relatively short period. Once the nut has left its seat, the continued jarring rapidly causes it to recede therefrom, approaching the point of the bolt.

It is well known that long before the nuts of a fish-plate have become entirely disengaged from their bolts, the alinement between the two rails joined by that fish-plate will have become sufficiently disturbed to cause a derailment. To overcome this defect innumerable devices have been originated—many of them patented, more tried in practice. It must be that none of the known forms of nut-locks have given entire satisfaction, because on all railroads section gangs continue to inspect and set up on the fish-plate nuts at regular and frequent intervals.

The present invention aims to enable the nuts to be locked so securely that it will be impossible to unscrew them by jarring, or even intentionally with tools, without first cutting or otherwise removing the locking plate, which is well protected against accidental injury by its position, ensconced between the root of the outer half of the rail-head and the flange or base of the fish-plate, or of the rail, when the butt-strap is not carried beyond the lower end of the web.

In the accompanying drawing, illustrative of the improved device, Figure 1, is a perspective view of a complete nut-lock for a fish plate of ordinary construction and size, as seen from the side, the nut-locking plate being partly turned upward from the bearing plate to better show the separate parts; Fig. 2, a transverse vertical section of a part of the rail and fish-plate, showing a part of the bolt, the nut and nut-lock in end elevation; Fig. 3, a side elevation of a part of the nut-locking plate, corresponding to one bolt-point, said plate being folded down into its normal position against the bearing plate; Fig. 4, a vertical transverse section of the nut-locking plate, folded against the bearing plate, showing a part of the nut-lock in end elevation; Fig. 5, a transverse, vertical section of the bearing plate with the nut-locking plate turned up at right angles thereto, one of the lateral locking wings being shown in end elevation; Fig. 6, a front elevation of an individual or separate locking plate, and a part of its adjacent plate all attached to a common bearing plate; Fig. 7, a modification of the bearing plate in front and end elevation, showing means for securing it against being turned when applied to flat surfaces, and especially wood work; and Figs. 8 and 9 show two forms of the locking aperture as applied to hexagonal nuts, or bolt heads.

The bolt 2, of the known construction common to fish-plate bolts, is inserted, from the inner side of the rail end through the hole 3 in the rail, the section of which is elliptical, the major axis being horizontal. The ellipticity is sufficient to allow the bolts to be moved backward and forward longitudinally by the contraction and expansion of the rails. The bolt is further thrust through hole 4, of the same size and form as hole 3, and punched in bearing plate 5, which lies up close against the outer face of the fish-plate, being temporarily supported in place by the engagement of the perforations 4 with bolts 2.

The bearing-plate or hinge plate 5 is substantially a rectangular strip of sheet metal, preferably sheet steel of about 13 Birmingham wire gage, which may or may not be galvanized, lacquered or otherwise covered with some suitable anti-rusting protective coating or skin. Its length is determined by the length of the fish-plate with which it coöperates, being preferably made sufficiently long, and provided with sufficient holes 4 to take in all the bolts of the fish-plate, four in this case, and extend somewhat beyond the end bolts. The width or height corresponds to the height of the vertical or web portion of the fish-plate. At its upper edge the bearing plate carries a number of hinge-knuckles $5^a$, $5^a$, formed integral with the plate by curling upon themselves laterally extending strips, formed by cutting rectangular recesses in the plate, extending inwardly far enough to provide sufficient length for the strips, so that after being rolled or curled up they will leave an adequate axial opening for the insertion of the pintle or through-pin 8. Knuckles $5^a$ jut out from the upper edge of plate 5 along its entire length, being separated from one another by said recessed parts, each preferably of the same length as the knuckle of the bearing-plate. By the same system of construction the upper edge of locking-plate 6 is provided with what may be termed male knuckles $6^a$, of the same length as knuckles $5^a$, and having each an axial opening of the same diameter as the female knuckles, whereby the knuckles of the two plates may be meshed together and pivotally inter-connected by through-pin 8, so that the bearing-plate forms with the locking-plate a butt-hinge, each being one of the hinge-plates or straps.

From the drawing it will be noted that both the knuckles integral with the bearing-plate and those of the locking-plate are curled outwardly, care being taken to carry the axial line common to both sets of knuckles outward sufficiently far to enable the locking-plate to be folded snugly against the outer face of the bearing-plate. This locking-plate corresponds in shape with the bearing-plate, but is here shown to be shorter than the latter by the length of two knuckles. It is evident, that it might also be made longer than the bearing-plate by the same amount. The lower edge of the locking plate is bent inward and upward forming a hook-shaped gutter 9. At each of the appropriate points, corresponding to the bolt holes 4 in the bearing plate the locking plate is cut with a rectangular aperture, the middle point of which registers with the center of the corresponding bolt hole and bolt. The metal of the plate, which filled the space corresponding to the square aperture before this was punched out, is slit diagonally at the four corners, whereupon each side 13 and 14 between the diagonal slits is cut on a line parallel to the base 11, 12 of the wing to be formed, at a distance inward from said base measured perpendicularly thereto, preferably somewhat exceeding the height or thickness of the nut, though it may be less, and again the slits may be allowed to cross each other at the center of figure of the rectangle. Whatever be the disposition the slit metal is pushed outward from the inner side, forming four wings integral with the locking plate, and projecting outwardly from it at right angles. Of these the top and bottom wings 13, 13, are longer than the two side wings 14, 14, the difference being the same as that between the minor and major axes of the elliptical holes 3 and 4, and provided for the same reason. The height of the rectangular aperture, or, what is the same dimension, the length of base 12, is just sufficiently greater than the length of the face or square of nut 15, which is next screwed on the point of bolt 2, to enable the aperture 10 to be fitted over the nut when it has been set home against the face of the bearing plate. The bottom or bearing side of the nut extends beyond the edges of the bolt hole 4 in every direction so that the four nuts suffice to hold the bearing plate up in position against the fish plate. After the nut has been screwed home, locking plate 6 is brought up to the bearing plate, its apertures 10 are placed in partial engagement with the corresponding nuts, and the gutter or lip 9 inside of the lower edge is brought into engagement with the lower edge of the bearing plate, by slipping the locking plate upwardly along the outer face of the bearing plate as much as the nut will allow, springing the lower edge of the bearing plate out a little if need be, or slipping lip 9 under the projecting offset $9^a$ that may be provided along the bottom edge of the bearing plate, as shown in Fig. 5. Where no offset is provided introduction of the lip is assisted by the fact that the nut cannot be set up against the bearing plate so tight that the latter is frictionally held against the fish plate to the extent of its interfering with the movements of the bolt in a horizontal direction, due to expansion and contraction.

After the male knuckles $6^a$ on the locking plate have been inserted between the respective female knuckles $5^a$ on the bearing plate, the axial holes brought into alinement, and the locking wings 13 and 14 of the four apertures fitted to inclose their respective nuts, the long pintle or pin 8 is threaded or inserted through the successive axial holes 7 in all the hinge-knuckles, forming a complete and compact butt-hinge. The leading end is preferably tapered to enable it to more readily enter the different holes, after the manner of a drift pin. Once the pintle is in place this end projects slightly beyond the outer face of the last hinge-knuckle. This projection may be left as it is, serving to hammer on for starting the pintle from its seats when it is desired to disengage the locking plate, or it may be riveted over, the rivet being cut off when the nut lock is to be dismounted. At its other end the pintle is preferably fashioned into an eye $8^a$, which facilitates handling the pin in entering it, and is adapted to receive a hook or toggle to assist in withdrawing the pin.

It is evident from the above, as the top and bottom sides or faces of the nut are closely engaged by the top and bottom locking wings 13, 13, and the side wings 14, 14 are sufficiently close to the lateral edges or sides of the nut to cause it to bring up on them as soon as it had completed but a short turn, even if the top and bottom wings should become sufficiently injured to allow the nut to unscrew at all, that the nut cannot possibly be unscrewed from its bolt accidentally, or by jarring or intentionally without the previous removal of the locking-plate.

Instead of providing one locking plate common to all the nuts of the fish plate, an individual locking-plate, otherwise of the same construction as that just described may be provided for each nut, as shown in Fig. 6. In this case the allowance for longitudinal clearance or movement may be made either by making the hole in the bearing plate elliptical and that in the locking plate oblong, as before, the longer dimension in each case being the horizontal one, the hinge knuckles remaining as before, or by using the same disposition of the hole for the bolt and of the hole for the nut, and assisting this by cutting sufficient off each end of each knuckle to procure clearance enough 5$^b$ between the male knuckles 6$^a$ and the female knuckles 5$^a$. In this case a corresponding amount would have to be taken off of each side of each individual locking plate, if they are made to jointly cover the entire face of the bearing plate. Finally, the last mentioned means for providing clearance longitudinally between the several elements of the device may be solely relied upon, making the bolt hole in the bearing plate circular, and the aperture in the locking plate square. Probably the arrangement that will insure most safely against the locking plates' buckling or being rent by the dimension changing effects due to variations in temperature would be the combination of the holes enlarged horizontally, and of the clearance between the sides of contiguous individual locking plates. Where individual locking plates are used they may extend for only a short distance longitudinally beyond the locking aperture, or made to almost meet the contiguous plates on each side.

Another modification entirely within the purview of this invention is to provide individual bearing plates either one for each bolt, or plates taking in two or more bolts, and either in coöperation with a locking plate common to all the bearing plates or with individual locking plates. In these modifications it is preferable to always provide one integral or complete member, be it the locking, or the bearing plate so as to give compactness and stiffness to the hinge structure.

While the inwardly curving lip or gutter 9, running along the bottom edge of locking plate 6 does serve to make a compact union between the two hinge plates, it is not an absolutely necessary feature of the construction. In Fig. 2 I have shown the locking plate carried down so that its lower edge extends only as far as that of the bearing plate, with which it forms a continuous surface.

Clearly the same device, above described for locking the nut of the bolt may also be applied at the opposite end of the bolt to prevent its head from turning or being turned. Such application is feasible either with the integral locking and bearing plates, the integral bearing and individual locking plates or individual locking and bearing plates. Being wholly identical with the device shown and described for retaining the nut, this method of locking the bolt head is not separately illustrated.

When the locking device is applied to bolts in structures other than fish-plate joints, and especially in wood work, such as that of the bolsters, brake-beams, trucks, etc., of cars the bearing plate, which in the rail joint construction is prevented from turning by the head and flange of the rail, may lack such stops, so as to be free to turn with the nut or the bolt, being carried around by the very locking device, which would evidently render it nugatory. For such cases the bearing plate may be secured to the surface of the wood by screws A, preferably passing through screw holes provided in small recesses or countersinks, B, projecting inwardly, as shown in Fig. 7. The locking plate lying close against the bearing plate and covering the screw heads will prevent their being jarred loose from their seats in the wood. Again, where a ledge or edge of the structure is at hand, spurs C, made by bending parts of the metal of the bearing plate, at the sides of the hinge knuckle, either inward or outward, as the case may be, will prevent the turning of the plate when brought to bear against said projections or sides of the structure. For flat surfaces, incisions made in the wood will hold the spurs, and thereby the plate. Up to this point the locking device has only been considered in connection with square nuts and bolt heads. Where hexagonal nuts or heads are used, as is not infrequently the case, the underlying principle of the lock remains unchanged. The same rectangular shape of the locking wing aperture may be retained, the top and bottom wings being spaced apart so that they closely infold those edges or faces of nut which may come to the top and bottom when the nut is set up as far as required. Using this form of wing-nut aperture the side wings 14 must be spaced apart sufficiently to encompass the two side corners that will be turned so that the diagonal between them will be horizontal, as well as to make the additional allowance for longitudinal movement due to expansion and contraction of the rails.

The form of lock for hexagonal nuts which is the one most easily and cheaply made and applied, is represented in Fig. 8. While entirely sufficient for locking purposes, where it may be desired for any particular reason, the locking-wing aperture and wings may be shaped as shown in Fig. 9. Here the contour of the aperture for the nut is that of the hexagonal faces or edges of the nut, when turned so as to have two edges horizontal, excepting that the two horizontal edges of the opening, and the two horizontal wings are as much longer than the corresponding faces of the nut, as the horizontal or major axis of the elliptical hole in the bearing plate is longer than its minor axis. Similarly nuts of any other special form may be locked in place by obvious modifications of the shape of the locking aperture. As long as the bolt remains round, which it almost always is, the hole in the bearing plate remains preferably elliptical. Where bolts locked by this device are not constrained to move in any direction radial to its axis, the hole in the bearing plate is made round and the locking aperture square, or truly hexagonal, etc., as the case may be. When movement of the bolt is vertical the major axis of the elliptical bolt hole is made vertical, and the rectangular locking aperture has its longest side placed in the same direction etc.

I claim:

A nut lock comprising a base plate provided with openings and having one side portion bent to form a longitudinally extending off-set strip, a locking plate having one side portion bent to form a longitudinally extending pocket to receive said strip and being provided with openings adapted to register with the openings in said base plate, locking tongues extending from the openings in said locking plate, and means for removably securing the opposite side portions of said plates together.

In testimony whereof I affix my signature in presence of two witnesses.

WILLIAM JOHN McGAVOCK.

Witnesses:
E. SCHUB,
EDWARDO RAMERO.